(12) United States Patent  
Kazuhiro et al.

(10) Patent No.: US 7,134,778 B2  
(45) Date of Patent: Nov. 14, 2006

(54) RESEMBLING PRISMATIC STRUCTURE OF LIGHT GUIDE PLATE

(76) Inventors: Miyashita Kazuhiro, 4F-2 No. 149-15, Heping 1st Road, Lingya Chiu, Kaohsiung, 802 (TW); Liu Yu-Ping, 4F-2 No. 149-15, Heping 1st Road, Lingya Chiu, Kaohsiung, 802 (TW); Chung Chao-Fang, 4F-2 No. 149-15, Heping 1st Road, Lingya Chiu, Kaohsiung, 802 (TW)

( * ) Notice: Subject to any disclaimer, the term of this patent is extended or adjusted under 35 U.S.C. 154(b) by 215 days.

(21) Appl. No.: 10/910,429

(22) Filed: Aug. 2, 2004

(65) Prior Publication Data

US 2005/0248961 A1    Nov. 10, 2005

(30) Foreign Application Priority Data

May 7, 2004    (TW) .............................. 93112999 A

(51) Int. Cl.
  *F21V 7/04*    (2006.01)
  *F21V 8/00*    (2006.01)
(52) U.S. Cl. ...................... 362/620; 362/561; 362/613; 362/624
(58) Field of Classification Search .................. 362/27, 362/331, 332, 339, 561, 606, 613, 614, 615, 362/617, 619, 620, 623, 624, 628; 349/65
  See application file for complete search history.

(56) References Cited

U.S. PATENT DOCUMENTS 5,485,291 A * 1/1996 Qiao et al. .................. 362/615
5,719,649 A * 2/1998 Shono et al. ................ 362/623
5,779,337 A * 7/1998 Saito et al. .................. 362/619

* cited by examiner

Primary Examiner—Y. My Quach-Lee

(57) ABSTRACT

The present invention provides a resembling prismatic structure of light guide plate to economize the optical films such as prismatic film, diffusion film, reflection film and . . . etc. The present invention simplifies the multifarious structures of the prior LCD backlight modules. It can efficiently decrease the material of making the backlight module and the cost of the manufacturing time.

In comparison with that conventional LCD backlight module emits light wholly, continuously and evenly from light emitting face of light guiding plate. Large amount of energy is wasted in the conventional backlight module owing to its illumination on the opaque part of LCD substrate such as common electrode and black matrix.

As the resembling prismatic structure of the light guide plate of the present invention make light emit from specified positions, and be limited to small angle and pointing to each corresponding opening of LCD substrate, energy can be used efficiently; brightness can be raised; display quality can be promoted; electricity energy consumption can be lowered down, and life of battery can be postponed.

11 Claims, 15 Drawing Sheets

12n

12n

RESEMBLING PRISMATIC STRUCTURE OF LIGHT GUIDE PLATE

BACKGROUND OF THE INVENTION

1. Field of the Invention

The present invention relates to a light guide plate, in particular to a light guide with a plurality of resembling triangular prisms.

The present invention provides a resembling prismatic structure of light guide plate to solve the waste of energy of light and creates emitting light from the non-uniform, selected, multiple and specific positions. The beams of the emitting light can also be focused to a special direction pointing to the opening of LCD substrate by the controlled, multiple and parallel entering light. The present invention simplifies the multifarious structures of the prior LCD backlight modules.

2. Disciption of Related Art

In generally, the backlight module comprises the light guide plate, the diffusion film and reflection film. In order to get the uniformly emitting light, the prior LCD backlight modules use the films having optical effects. These films include the prismatic film, the diffusion film, the reflection film and . . . etc. The energy of light was lost in the processes of repeating refraction and reflection between these films and wasted in the irradiation of the light irradiated the un-translucent part of the LCD.

As illustrated in U.S. Pat. No. 5,917,664, while it is formed by prism arrays, its aim is to avoid sudden change of brightness when across certain angle during changing viewing-angle.

Further, as shown in FIGS. 9a and 9b, "light guide plate having multi-focused reflecting patterns" of TAIWAN PATENT published No. 463957 has a plurality of multi-focused reflecting patterns on opposite face of emitting face of light guide plate. Each pattern has a round surface at center, with a plurality of annular round surfaces being concentric from said round surface. Incident light is reflected, by each pattern on light guide plate, upwards to form plane-type light source. This prior art is that brightness of plane-type light source is made evenly distributed by multi-directioned reflection of multi-focused reflecting mirrors.

The prior arts of backlight module mainly focus on emitting light evenly; As shown in U.S. Pat. No. 6,356,391, however it is formed by prism arrays also, its aim is to get light emitting of continuous and entire evenness.

As illustrated in FIGS. 10a and 10b, "plane-type light source" of TAIWAN PATENT published No. 538285 utilizes multi-direction refraction of concave lenses 11n or convex lenses11p so that the emitting face near lateral incident face has enough brightness.

As illustrated in FIGS. 11a, 11b, 12a and 12b, this prior art also has variant distribution concentration of concave mirrors12p or convex mirrors12n on opposite face of emitting face of light guide plate and lateral faces except incident face.

By the way of multi-direction of concave and convex mirrors' reflection and higher concentration of reflecting mirrors in periphery of light guide plate h where brightness is apt to be insufficient, it is possible to achieve evenness of brightness and direction of emitting of plane-type light source. The technological thought of the present invention is distinct from this prior art.

As illustrated in FIG. 13, "LCD having localized-light-transmitting backlight" of TAIWAN PATENT published No. 560621 has a plurality of light passages52 in reflecting layer51 on the bottom of LCD f, and has a micro-prisms-arrayed optical film g possessing light-focusing portions61 corresponding to light passages52, between LCD f and light guide plate h. The artificial light L5, after being concentrated, transmits through light passages52 in reflecting layer51, and into LCD f. The total output comes from combined effects of highly reflected natural light L4 from reflecting layer51 and artificial light L5 enhanced by micro-prism-arrayed optical film g, with enhanced total light output of LCD.

The stronger function of light-focusing portions61, the more artificial light L5 transmitting through light passages52, and the less proportion of area occupied by light passages52, and therefore the larger proportion of area used to reflect, and then more reflected natural light L4 can be used. According to this design, light output of LCD f can be promoted, and contrast of LCD f to natural light L4 can be increased.

This prior art is characterized in reflecting layer51 possessing light passages52 and micro-prisms-arrayed optical film g possessing light-focusing portions61.

Although it would make emitted artificial light L5 point to specified positions according to its claims' declaration, the critical structure of micro-prisms-arrayed optical film g possessing light-focusing portions61 and corresponding parameters thereof are not disclosed at all.

Most important of all, the present invention discloses not only its optical process, but also the microstructure, including its characteristics and its corresponding parameters.

SUMMARY OF THE INVENTION

The present invention provides a resembling prismatic structure of light guide plate to solve the waste of energy of light and to use energy of light economically. In generally, the backlight module is comprised of the light guide plate, the diffusion film and reflection film. In order to get the uniformly emitting light, the prior LCD backlight modules use the films having optical effects. These films include the prismatic film, the diffusion film, the reflection film and . . . etc. The energy of light was lost in the processes of repeating refraction and reflection between these films and wasted in the irradiation of the light irradiated the un-translucent part of the LCD. The present invention has created emitting light from the non-uniform, selected, multiple and specifical positions. The beams of the emitting light can also be focused to a special direction pointing to the opening of LCD substrate by the controlled, multiple and parallel entering light. The present invention simplifies the multifarious structures of the prior LCD backlight modules.

The main objective of the subject invention is to provide a resembling prismatic structure of light guide plate. The light sources can be the usual or the controlled, multiple and parallel entering light source. The light enters the light guide plate and is guided to the special direction by the designed prismatic structure.

The other objective of the subject invention is to provide an emitting light from the non-uniform, selected, multiple and specifical positions. The beams of the emitting light can also be focused to a special direction pointing to the opening of LCD substrate by the controlled, multiple and parallel entering light. The brightness can be enhanced and the quality of LCD will be better. The energy of light can be used efficiently, so the life time of the battery will be longer.

Another objective of the subject invention is to provide a simplificative design of the LCD backlight module. It can efficiently decrease the material of making the backlight module and the cost of the manufacturing time.

DETAILED DESCRIPTION OF PREFERRED EMBODIMENT

Figure 1:
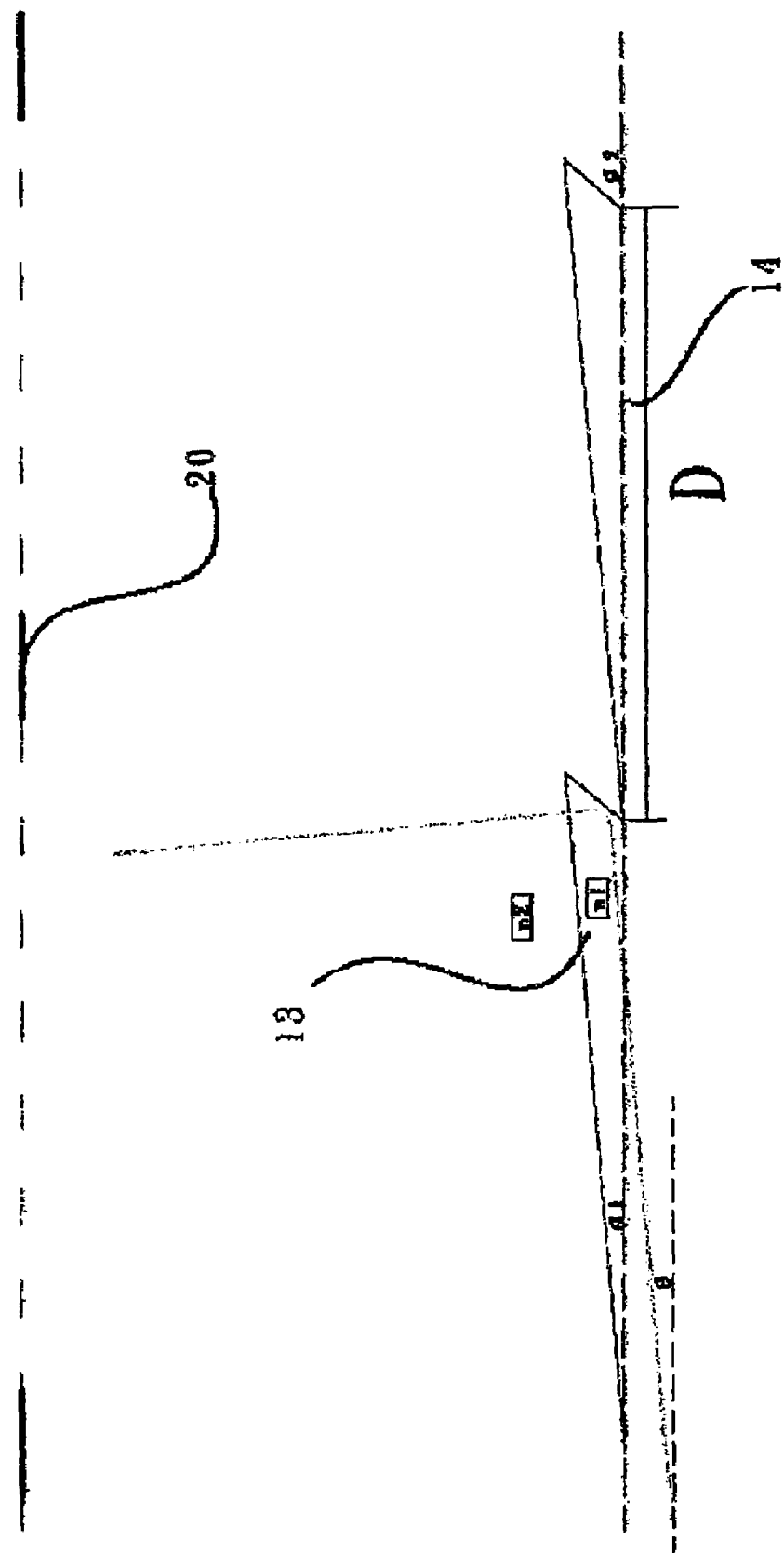
FIG. 1 illustrates the structure of the present invention.

Referring to FIG. 1, the resembling prismatic structure 13 is arranged in order by the obtuse triangle, D is the length of the base 14 of the prism. The length D is on the opposite side of the opening20 of LCD substrate. The light total reflecting and refracting from the resembling prismatic structure13 direct emits to the opening20 of LCD substrate. It will let the energy of light be used efficiently. The brightness will be enhanced and the quality of LCD will be better.

Figure 2:
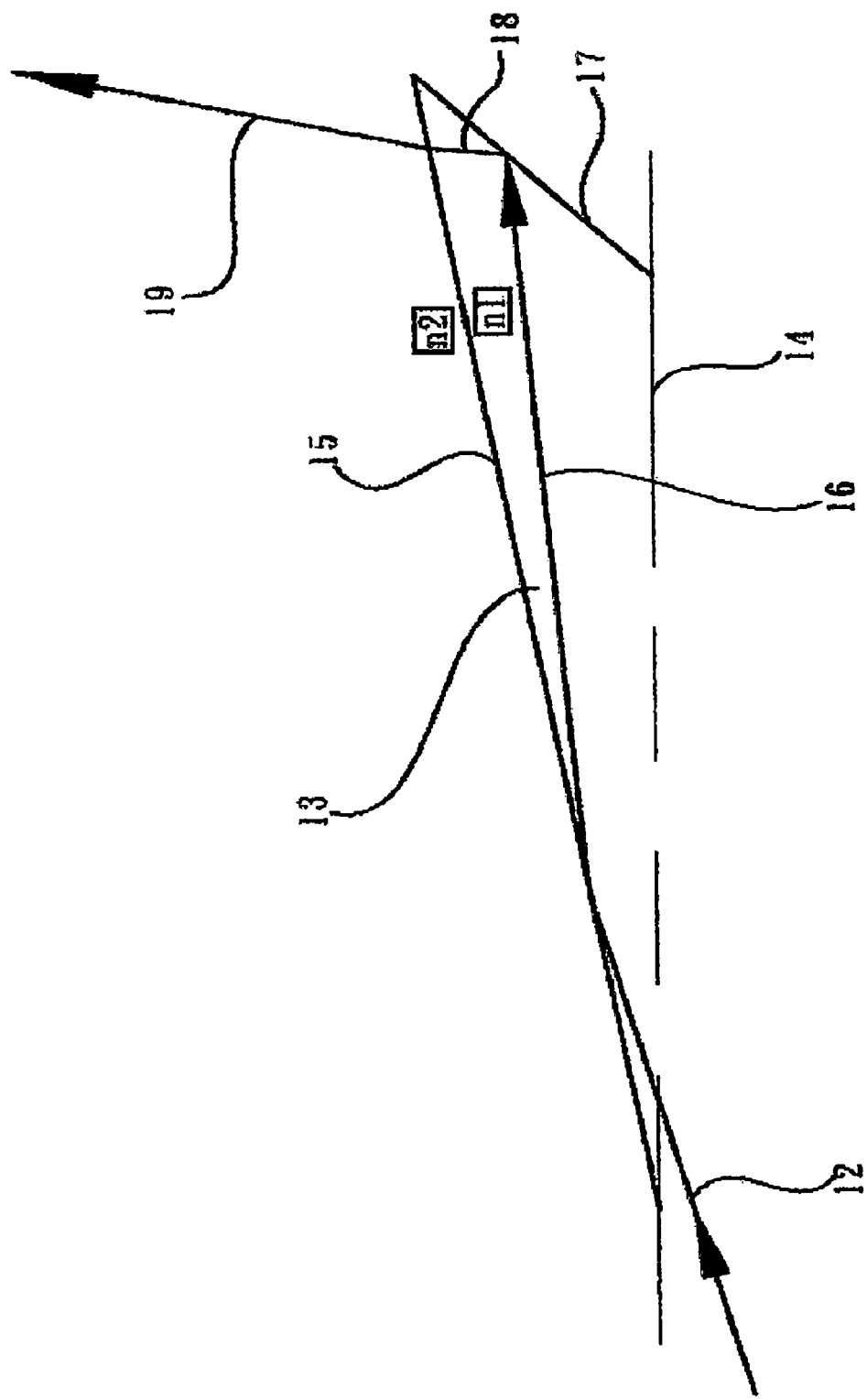
FIG. 2 illustrates the optical process of the present invention.
Figure 6A:
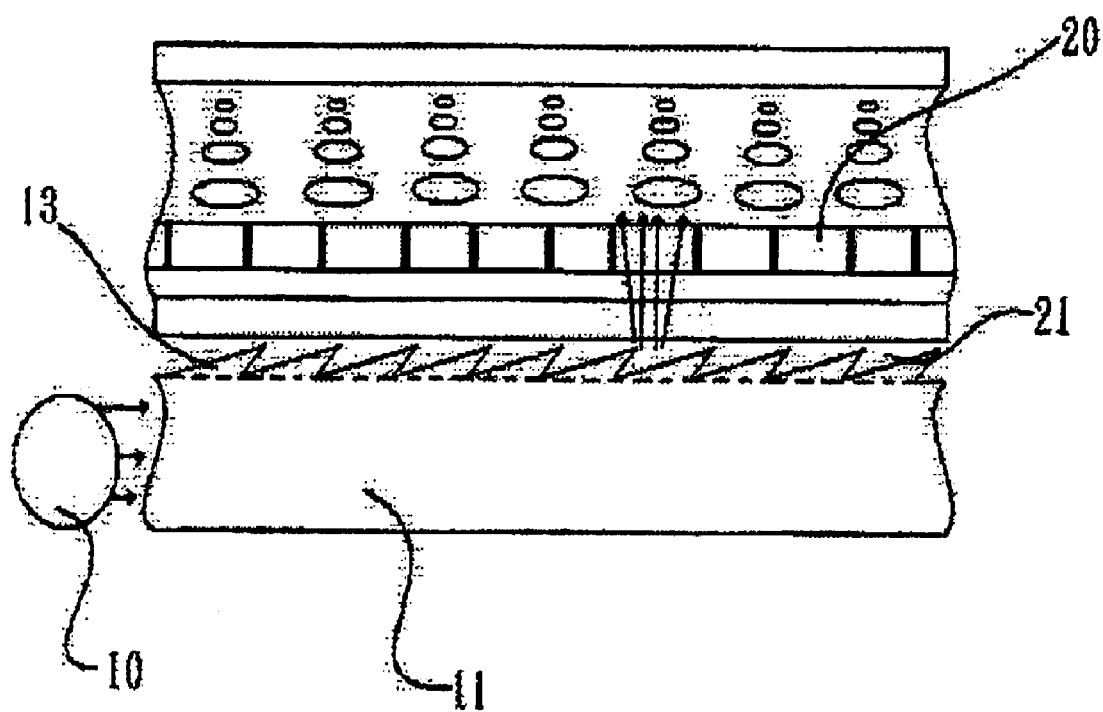
FIG. 6a illustrates the whole structure of the present invention.

Referring to FIGS. 2 and 6a one of the varial optical processes is shown. The light from the light source10 enters the light guide plate11 and the light guide plate11 produces the entering light12 with an angle θ. The entering light12 with an angle θ enters the resembling prismatic structure13 from the base14 of the prism. (The refractive index of the material of the light guide plate11 and the resembling prismatic structure13 is n1.) The entering light12 does the first total reflection16. (The included angle between the base14 and the slant15 of the prism is $\theta_1$) The light of the first total reflection16 does the second total reflection18 on the side17 of the prism. (the external angle between the extension of the base14 of the prism and the side17 of the prism is $\theta_2$) Finally, the light emits and refracts between the slant15 of the prism and the filling layer21. The direction of the refractive and emitting light19 almost vertically points to the opening20 of the LCD substrate. The refractive index n2 of the material of the filling layer21 is similar to the refractive index n1. The material of the filling layer21 can being film, liquid filling and air. The included angle $\theta_1$ and the external $\theta_2$ can be controlled by the manufacturing process.

Figure 3:
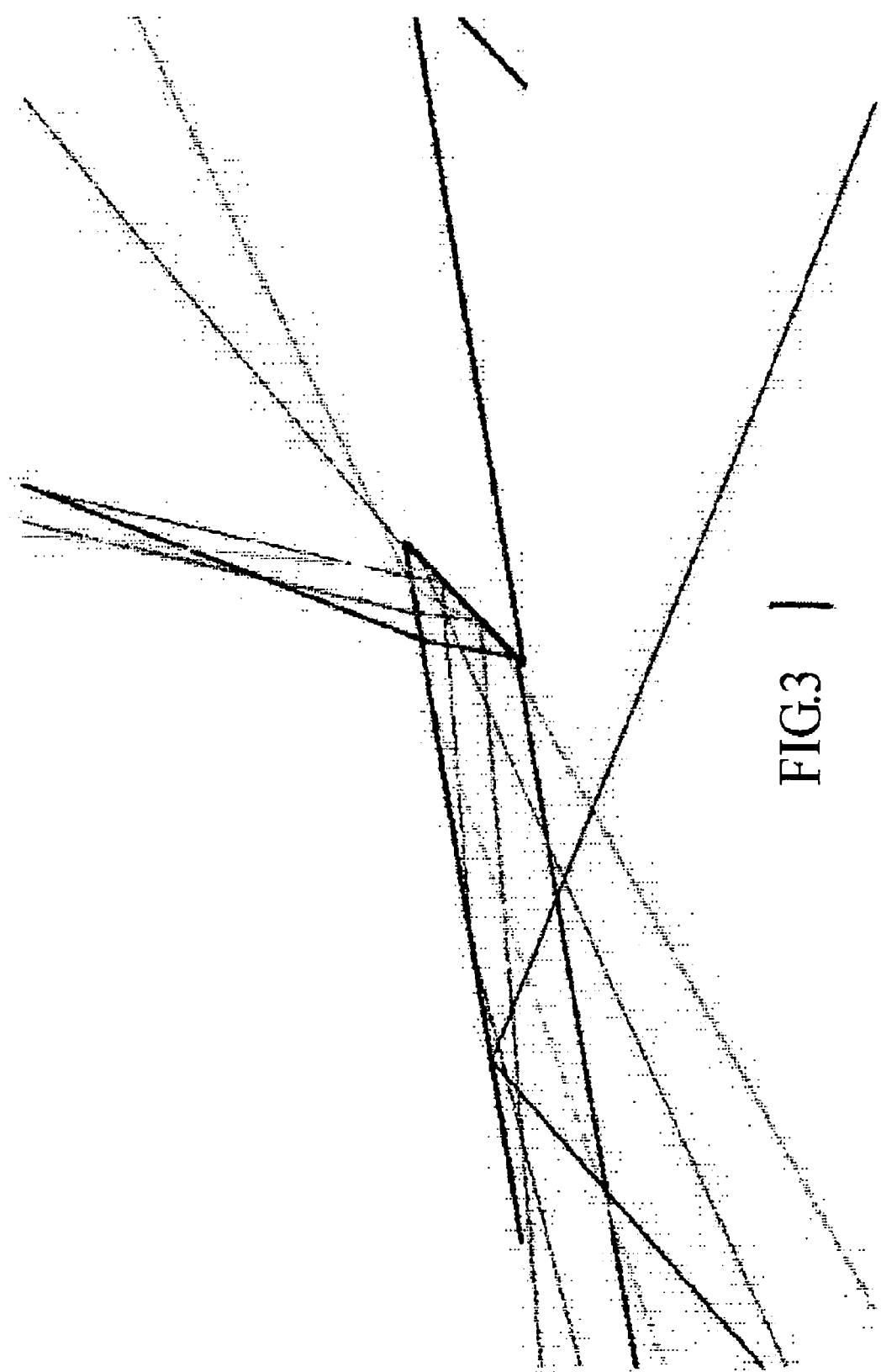
FIG. 3 illustrates the varial optical processes of the present invention.
Figure 6B:
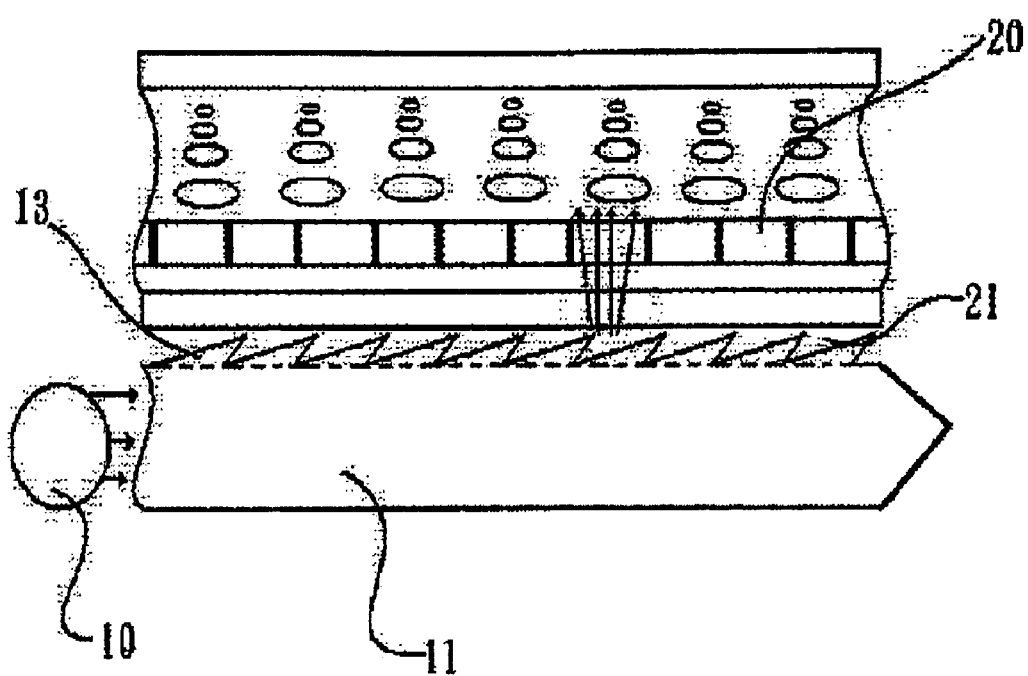
FIG. 6b illustrates the triangular and reflective structure of the present invention.

Referring to FIG. 6b, the opposite side of the light-entering side of the light guide plate11 is designed for a triangular included plane or a normal plane on which stuck a reflecting slice. This included plane on which stuck a reflecting slice can prevent the straight light which parallels the light guide plate11 from emitting out of the opposite side. ($\theta \approx 0°$) The straight light can totally reflect on the included plane on which stuck a reflecting slice and back into the light guide plate11. If the opposite side of the light-emitting side of light guide plate11 is stuck on a reflecting slice, it will decrease the loss of the tiny light refracting out of the light guide plane11. Referring to FIG. 3, the light with variable angle enters the resembling prismatic structure13.

The following table 1 illustrates the embodiment of the FIG. 1. Those specified and numeric values proposed in each embodiment are only some part of the present invention, and the range of the values can not limit the claim of the present invention.

TABLE 1 n1 = 1.49, n2 = 1, θc = 42.2°, The light of the light source is the controlled, multiple and parallel light. n1 is the refractive index of the material of the light guide plate and the resembling prismatic structure. n2 is the refractive index of the filling layer.(The filing of the present embodiment is air layer.) θ is the angle of the entering light. $\theta_1$ is the included angle between the base and the slant of the prism. $\theta_2$ is the external angle between the extension of the base of the prism and the side of the prism.

| θ (°) | $\theta_1$ (°) | $\theta_2$ (°) | The angle of the emitting light |
|---|---|---|---|
| 5 | 5 | 50 | \ <br> ----95----- |

Figure 4:
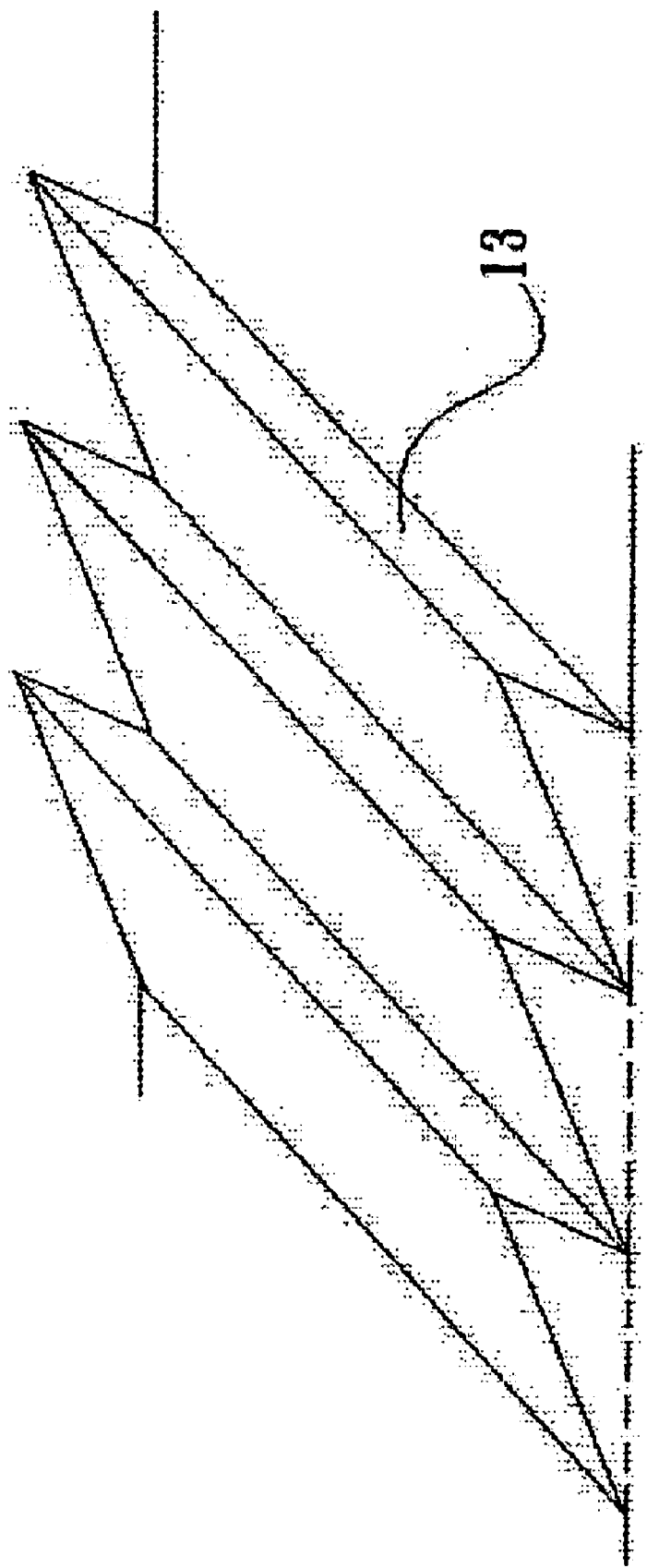
FIG. 4 illustrates the parallel, long and triangular pyramid whose distance is equal each to each of the present invention.
Figure 5:
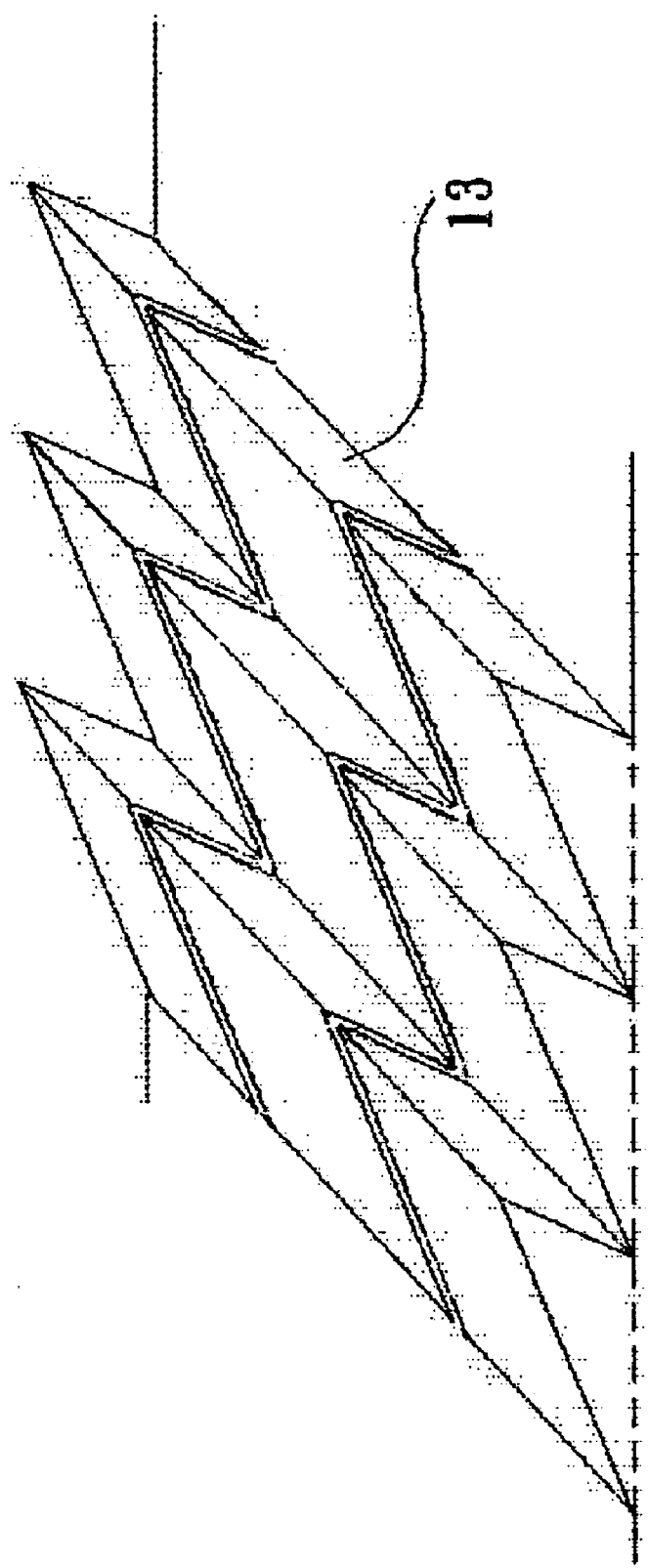
FIG. 5 illustrates the connected and triangular pyramid whose arrangement is array of the present invention.

Referring to FIG. 4, the resembling prismatic struture13 can be easily made of the long and triangular pyramids whose arrangement is parallel and distance is equal each to each. Referring to FIG. 5, the resembling prismatic struture13 can be made of the connected and triangular pyramids whose arrangement is array. The width of every triangular pyramid matches with the opening20 of the LCD substrate. The design of the present invention simplifies the multifarious optical films such as the diffusion film, the reflection film and . . . etc. The backlight module of the present invention can be made of a wholeness which the triangular prism is carved on the light guide plate or two pieces which the prismatic film and the light guide plate stuck on together. It can efficiently control and decrease the costs of the material of the backlight module and the time of manufacturing process.

Figure 8A:
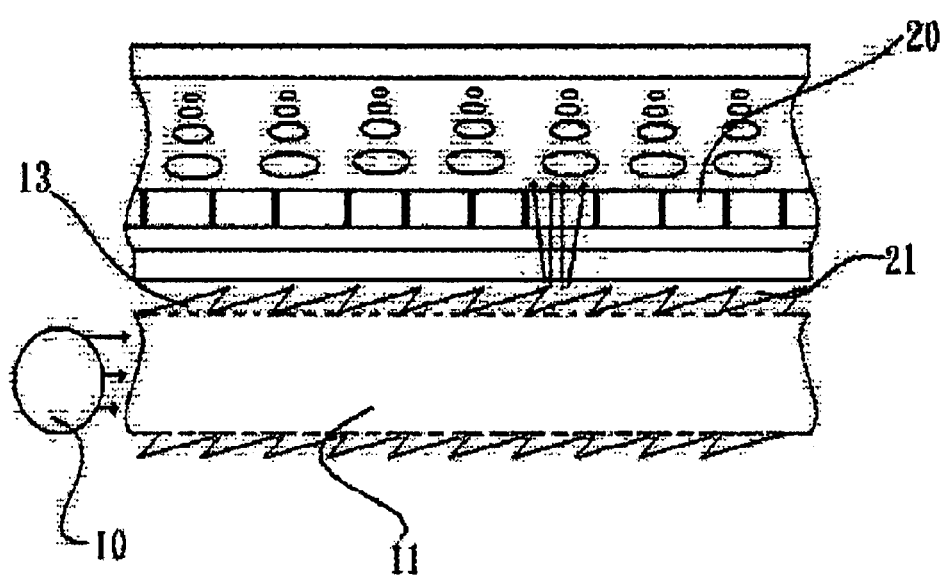
FIG. 8a illustrates the double-edged prismatic structure of the present invention.
Figure 8B:
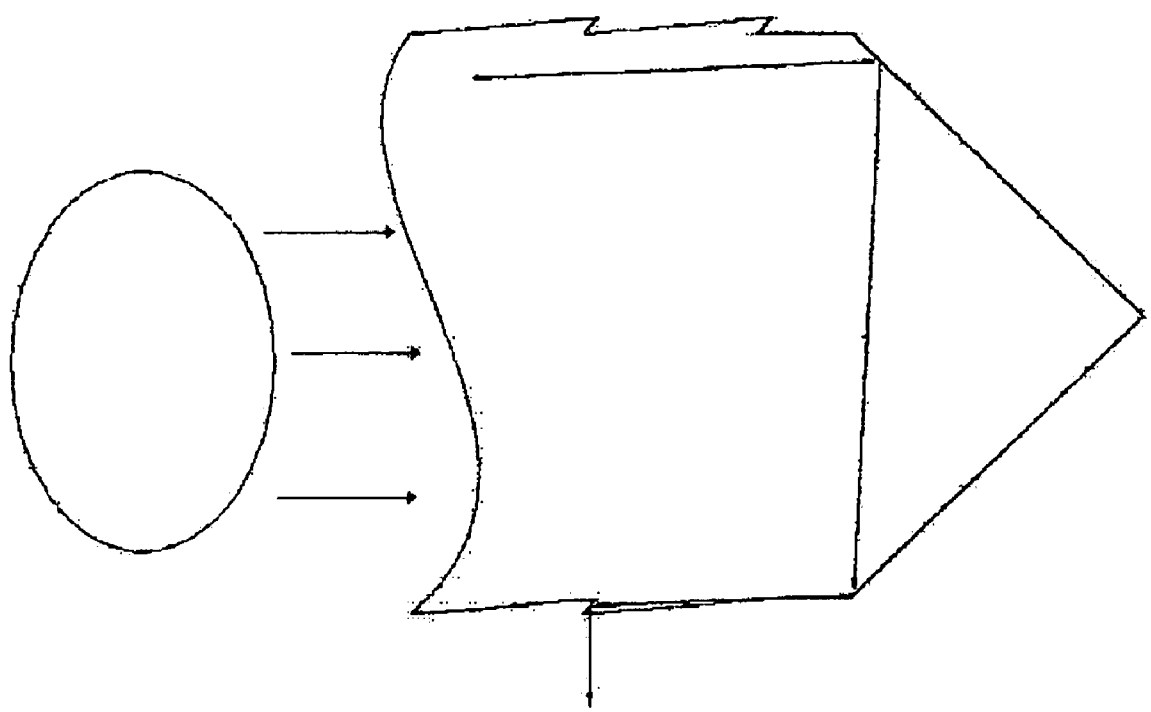
FIG. 8b illustrates the optical process in the double-edged prismatic structure with the triangular and reflective structure of the present invention.
Figure 9A:
FIGS. 9a and 9b illustrate representative drawings of "light guide plate having multi-focused reflecting patterns" of TAIWAN PATENT published No. 463957.
Figure 9B:
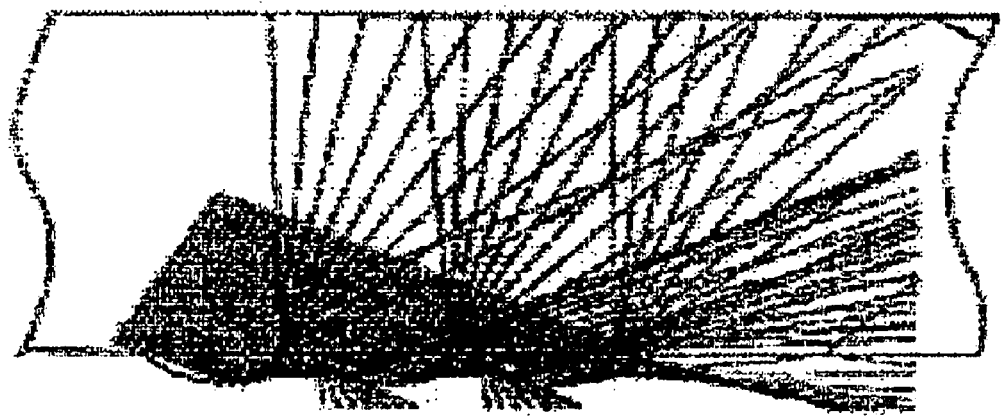
Figure 10A:
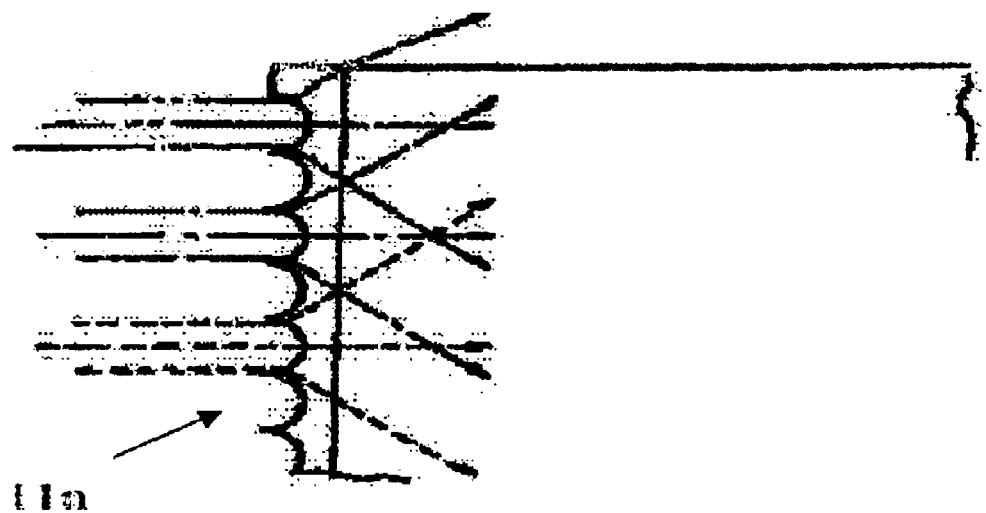
FIGS. 10a and 10b illustrate the first representative drawings of "plane-type light source" of TAIWAN PATENT published No. 538285.
Figure 10B:
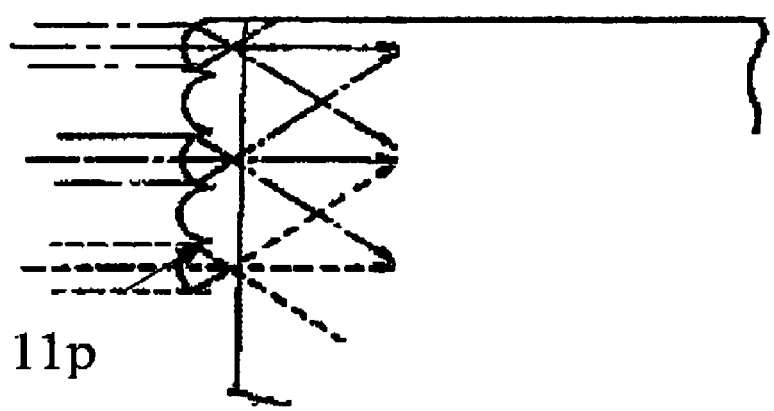
Figure 11A:
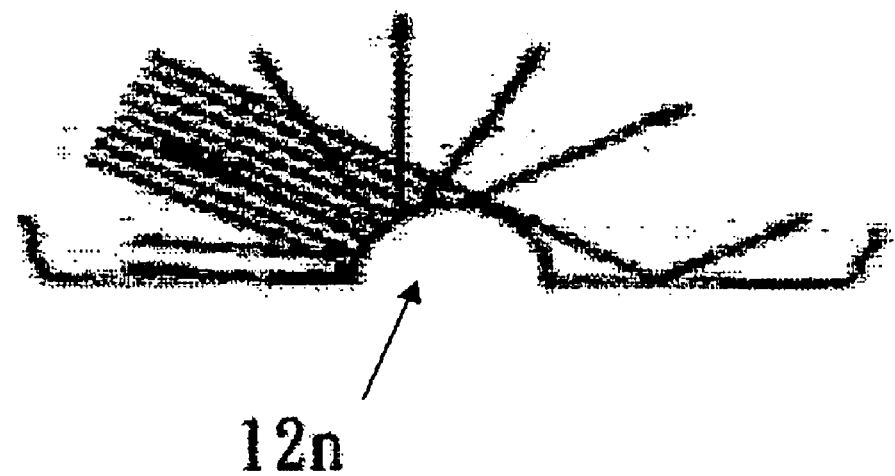
FIGS. 11a and 11b illustrate the second representative drawings of "plane-type light source" of TAIWAN PATENT published No. 538285.
Figure 11B:
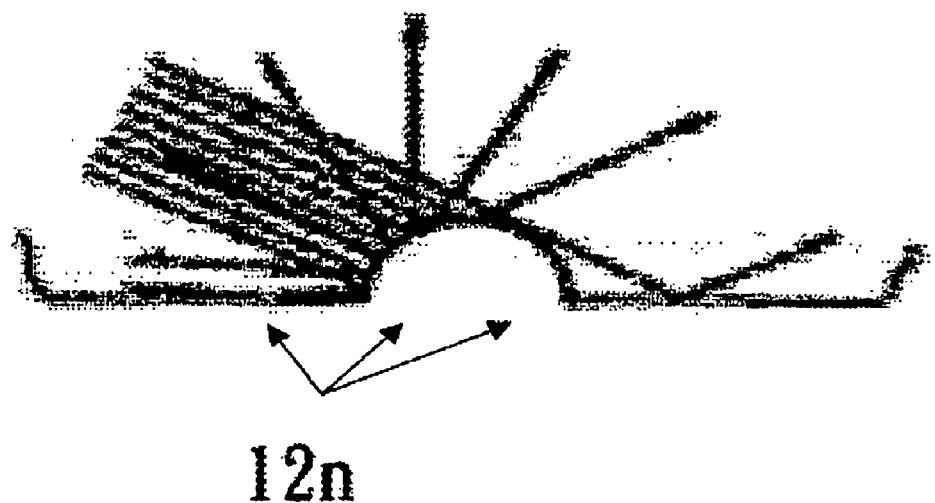
Figure 12A:
FIGS. 12a and 12b illustrate the third representative drawings of "plane-type light source" of TAIWAN PATENT published No. 538285.
Figure 12B:
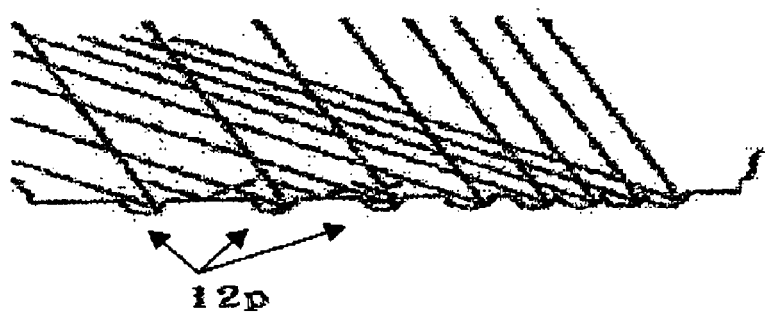
Figure 13:
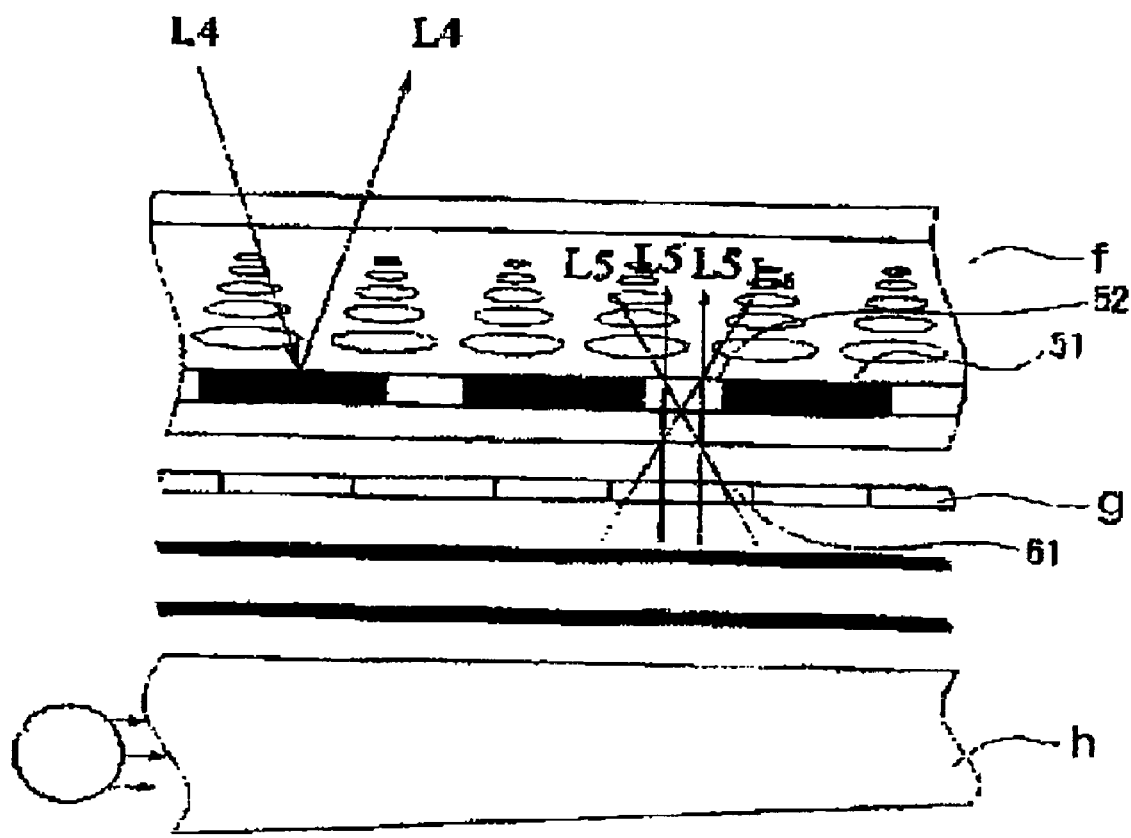
FIG. 13 illustrates representative drawing of "LCD having localized-light-transmitting backlight" of TAIWAN PATENT published No. 560621.

Referring to FIG. 8a, the light guide plate11 can have the double-edged prismatic structure. It can make the light guide plate11 have two-directional emitting light. If individually adding one LCD screen on two sides of the light guide plate11 with the double-edged prismatic structure, it will have the function of double screens. Referring to FIG. 8b, it is the light path in the light guide plate11 with the double-edged prismatic structure and the triangular included plane on which stuck a reflecting slice.

Figure 7:
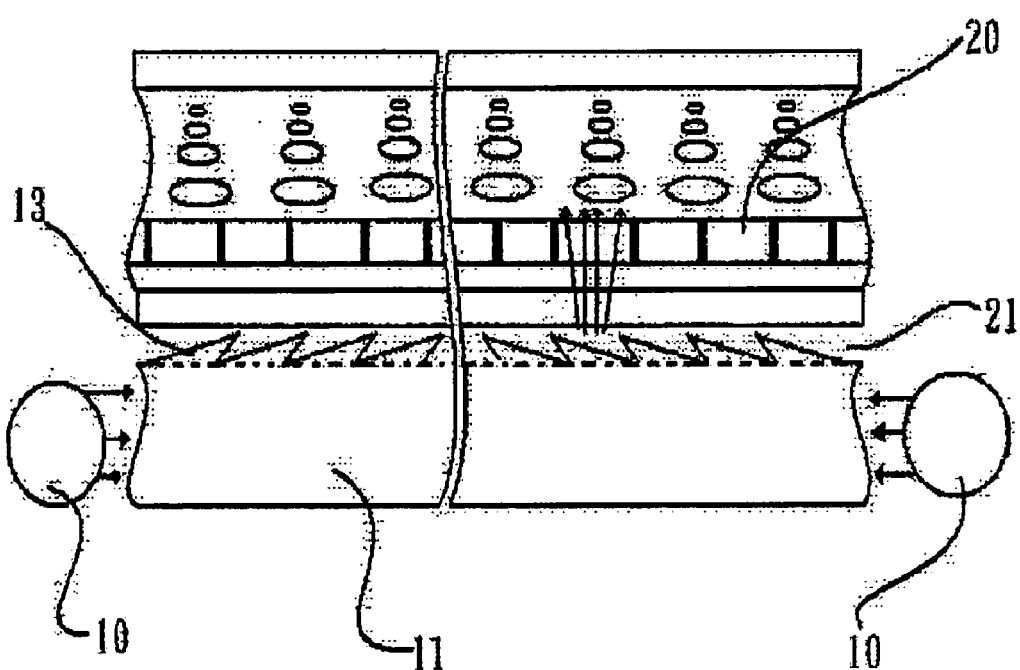
FIG. 7 illustrates the double light sources of the big size LCD panel of the present invention.

Referring to FIG. 7, the double light sources of the big size LCD panel of the present invention. When the size of the LCD panel is big, the light of the single light source is not enough to spread over the LCD panel. The light sources10 are individually set at the two sides of the light guide plate11 and the triangular pyramids of the resembling prismatic structure13 are arranged toward the centrality of the width of the light guide plate11. It can solve the problem that the transmission of light is not enough.

In the light source, the present invention can use the normal, uncontrolled and scattering light or the controlled, multiple and parallel light. The light from any position of light source enter the light-entering side of light guide plate. Every light totally reflects and then refracts to emit via the resembling prismatic structure of light guide plate. The special-designed angles of the resembling triangular prism make the light emit and point to the opening of the LCD substrate. The central line of the emitting light is equal to or smaller than the distance between the neighboring opening of LCD substrate.

The normal, uncontrolled and scattering light is guided to the resembling triangular prism by the light guide plate and emits to point to the opening of LCD substrate. The controlled, multiple and parallel light is guided to the resembling triangular prism by the light guide plate and vertically emits to point to the opening of LCD substrate.

The aim of the present invention is to solve the problem of conventional backlight module that large amount of energy is wasted in illuminating opaque portion of LCD substrate such as common electrode and black matrix, and to provide a kind of backlight module which emits light beams non-uniformly from specified positions and pointing to the opening of LCD substrate.

Any individual numeric value derived from spirit of the present invention by logical reasoning, mathematic calculation, or computer simulation, and any equivalent variation or modification are to be within claims range of the present invention. The embodiments mentioned above are only a portion of the present invention, the claims range of the present invention are not to be limited to those embodiments.

What is claimed is:

1. A resembling prismatic structure of light guide plate comprising:
   a light guide plate having three sides, wherein a flank side is used for conducting light into the light guide plate, the observed side of the light guide plate is used for emitting light, a base side is used for reflecting light;
   a plurality of resembling triangular prisms disposed on the observed side of the light guide plate, the resembling triangular prisms having a side face and a base face, wherein an included angle between each side face and the base face is more than 90 degrees;
   wherein a width of the base face of the resembling triangular prism is equal to or smaller than a distance of a neighboring opening of LCD substrate, and matches with a position of the opening of LCD substrate.

2. The resembling prismatic structure of light guide plate according to claim 1, wherein the plurality of resembling triangular prisms are made by long and triangular pyramids which are arranged in parallel and are spaced with an equal space.

3. The resembling prismatic structure of light guide plate according to claim 1, wherein a plurality of resembling triangular prisms are made of connected and triangular pyramids which are arranged as an array.

4. The resembling prismatic structure of light guide plate according to claim 1, wherein the light guide plate and the resembling triangular prisms are made by two pieces and stuck together.

5. The resembling prismatic structure of light guide plate according to claim 1, wherein the light reflecting base side of light guide plate is a glossy face.

6. The resembling prismatic structure of light guide plate according to claim 1, wherein all of the light is normal, uncontrolled and scattering light or the controlled, multiple and parallel light totally reflects in the resembling triangular prism and refracts to emit to an opening of LCD substrate.

7. The resembling prismatic structure of light guide plate according to claim 1, wherein the resembling triangular prism whose included angle belonging to side and base faces of the prism is more than 90° and the shape is obtuse triangle makes the entering light totally reflect and emit to the opening of LCD substrate.

8. The resembling prismatic structure of light guide plate according to claim 7, wherein an included angle between the base face and a slant face of the prism is $\theta_1$, an external angle between an extension of the base face of the prism and the side face of the prism is $\theta_2$, when the size of the LCD panel is big, in order to maintain the angle $\theta_1$, and $\theta_2$, light sources are individually set at opposite sides of the light guide plate and the triangular pyramids of the prisms are arranged toward the centrality of the width of the light guide plate.

9. The resembling prismatic structure of light guide plate according to claim 1, wherein there is a filling layer between the resembling triangular prisms and an LCD screen, the refractive index of the filling layer is similar to the refractive index of the resembling triangular prisms.

10. The resembling prismatic structure of light guide plate according to claim 1, wherein the opposite side of the flank side of light guide plate is designed for a triangular included plane or a normal plane on which stuck a reflecting slice.

11. The resembling prismatic structure of light guide plate according to claim 1, wherein the opposite side of the light-emitting side of light guide plate is stuck on a reflecting slice.

* * * * *